INVENTOR.
JOHN R. KRUEGER
BY
ATTORNEYS

INVENTOR.
JOHN R. KRUEGER
BY Frederick E. McMullen
ATTORNEYS

April 7, 1970 J. R. KRUEGER 3,504,908
DOCUMENT FEEDING APPARATUS CONTROL
Filed Jan. 17, 1968 5 Sheets-Sheet 4

INVENTOR.
JOHN R. KRUEGER
BY
ATTORNEYS

United States Patent Office 3,504,908
Patented Apr. 7, 1970

3,504,908
DOCUMENT FEEDING APPARATUS CONTROL
John R. Krueger, St. Georges, Del., assignor to Xerox Corporation, Rochester, N.Y., a corporation of New York
Filed Jan. 17, 1968, Ser. No. 698,557
Int. Cl. B65h 5/02
U.S. Cl. 271—10                                    6 Claims

ABSTRACT OF THE DISCLOSURE

A control for a document feeding apparatus having a reversible document feeding mechanism including a pair of bistable switching circuits controlling operation and direction of the document feeding mechanism with AND function gate controls to disable a part of the document feeding mechanism prior to reversal thereof, to operate the feeding mechanism for a predetermined period to clear the last document, and to stop the document feeding mechanism on failure of a document to feed.

This invention relates to a document feeding apparatus, and more particularly to a control arrangement for a document feeding apparatus.

Devices for feeding relatively thin readily deformable sheet-like pieces such as paper, film and so forth, singly from a supply source to a place of use as, for example, to the platen of a copying machine, are known in the art. However as can be appreciated, the present day trend toward faster operation with improved reliability and simplified, foolproof operation has rendered many known types of document and paper feeding devices obsolete; in some applications totally useless. The failure of known document feeding devices to meet the demand for higher speeds and greater reliability is primarily due to the inability of these feeding devices to consistently feed one document at a time from a supply of documents which may be randomly sized, without jamming, and without tearing or otherwise damaging the document.

It is a principal object of the present invention to provide a new and improved control arrangement for a document feeding apparatus.

It is a further object of the present invention to provide a logic type control and document jam protecting circuit for document feeding devices.

It is an object of the present invention to provide an improved solid state control for document feeders having a pair of bistable switching circuits, binary counter means driven in accordance with the document feeder machanism, and NAND gate controls for operating the switching circuits in response to the signal outputs of the counter.

This invention relates to an apparatus for feeding documents comprising in combination, document transport means including at least one transport device to initiate feeding movement of a document; means to drive the transport means; clutch means to couple the one transport device with the drive means; a first AND function gate adapted when triggered to actuate the clutch means and couple the one document transport device with the drive means; first bistable switching means adapted in one switching condition to trigger the first AND function gate and couple the one transport device with the drive means, the first switching means being adapted when in the one switching condition to actuate the drive means to drive the transport means in a document feeding direction; means responding to movement of the document being fed adapted on predetermined feeding movement of the document to render the first AND function gate inoperable whereby the one transport device is uncoupled from the drive means; second bistable switching means adapted in one switching condition to reverse the drive means and drive the transport means backwardly; a second AND function gate adapted when triggered to switch the second switching means to the one switching condition; means responsive to movement of the document transport means adapted following present document transport means movement in a document feeding direction to trigger the second AND function gate and switch the second switching means to the one switching condition whereby the drive means in reversed; and a third AND function gate adapted when triggered to switch the first switching means to a second switching condition whereby the drive means is rendered inoperative and the transport means stopped, the transport movement responsive means being adapted following preset document transport means movement in a reverse direction to trigger the third AND function gate and stop the transport means.

For a better understanding of this invention as well as other objects and further features thereof, reference is had to the following detailed description of the invention to be read in connection with the accompanying drawings, wherein.

Figure 1:
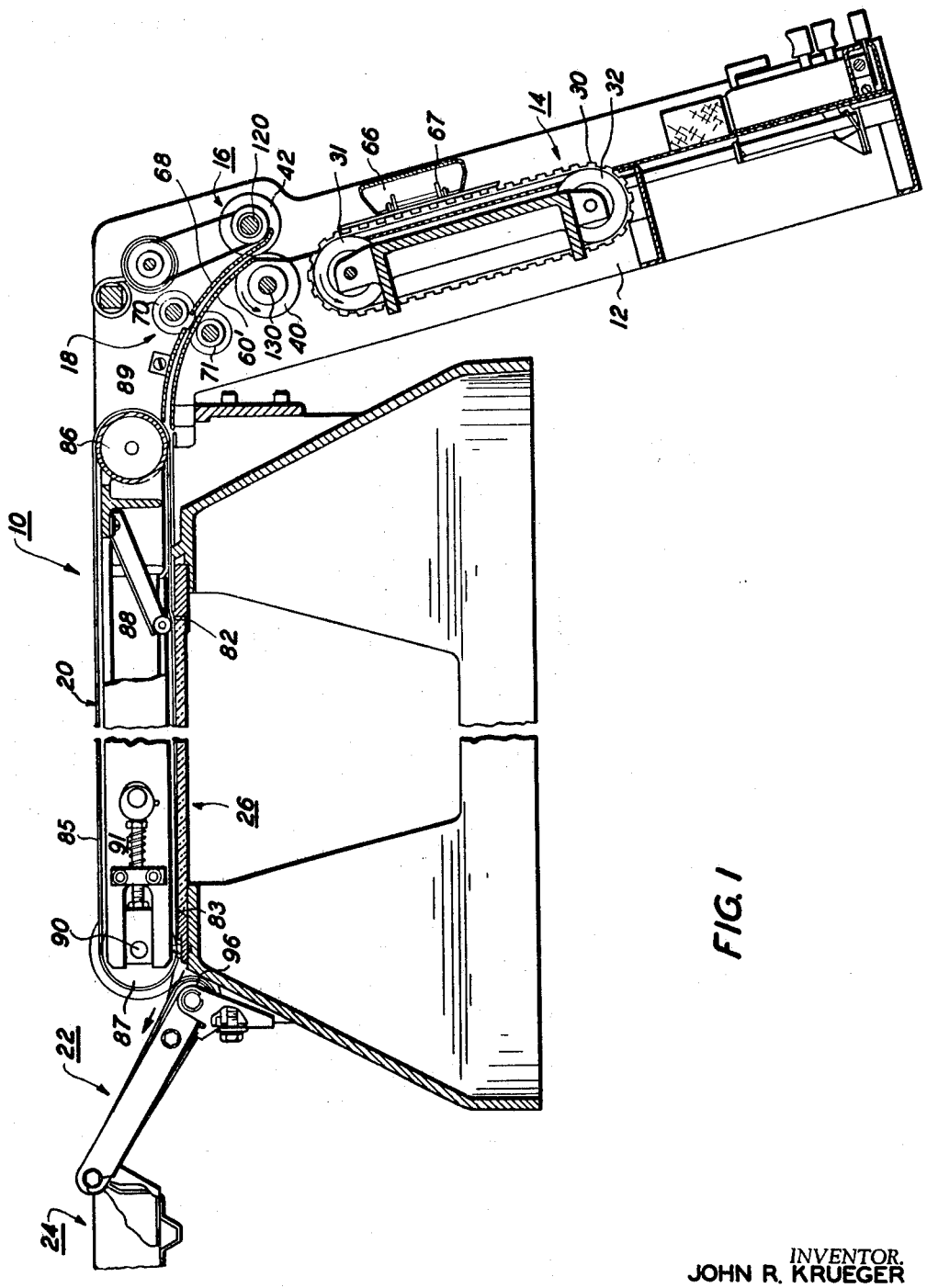
FIGURE 1 is a front view partly in section showing the document feeding apparatus of the present invention.

Referring to the drawings, there is shown the document feed apparatus, designated generally by the numeral 10, of the present invention. Document feed apparatus 10 which includes document supply tray 12, primary document feed 14, single document limiter 16, intermediate document feed 18, and transport 20, is adapted to feed any bendable sheet-like material such as paper, film, etc. As will become more apparent hereafter, document feed apparatus 10 feeds one document at a time from a quantity of documents, which may be of random size and thickness into a predetermined position on a surface 26, as for example, the platen of a document, copying machine (not shown).

A discharge feed 22 cooperates with transport 20 to clear documents from platen 26. Discharge feed 22 empties into return document tray 24.

In operation, the bottom document on supply tray 12 is advanced by belt 30 of primary feed 14 into the nip of rolls 40, 42 of single document limiter 16 which serves to limit feed to one document at a time. Document supply tray 12 is preferably tilted downwardly to enhance separation of individual documents during feeding. From single document limiter 16 the document is carried by intermediate feed 18 and transport 20 onto platen 26 where, as will appear more fully hereinafter, the document trailing edge is registered with stop 82. Following use, the document is removed by transport 20 and discharge feed 22 to return document tray 24 to complete the cycle.

Referring to FIGURES 1 through 4 of the drawings document tray 12 has a base 60 with lower end wall 61 and side walls 62. Preferably, an adjustable register 64 is provided to enable the width of tray 12 to be varied for various sized documents. Additionally end wall 61 is preferably arranged for longitudinal adjusting movement to accommodate various document lengths. Document retainer 66, which may be pivotally mounted on tray 12, overlays base 60 of tray 12. Springs 67 resiliently bias retainer 66 toward base 60 of tray 12. As can be understood retainer 66 serves to hold documents in place on tray 12.

To enhance separation of documents stored in tray 12, tray 12 is inclined downwardly. The angle of downward inclination of tray 12 relative to the horizontal is preferably greater than 45° but less than 80. For average weight and thickness documents, an angle of substantially 75° has been found to give optimum document separation. Slot-like opening 69 in base 60 of tray 12 accommodates belt 30 of primary feed 14, the belt 30 being operatively supported on drive and idler rollers 31, 32, respectively, such that the exposed surface of belt 30 is slightly above base 60 of tray 12. As will appear more fully hereinafter drive roller 31 of primary feed 14 is driven intermittently (in the counterclockwise direction shown by the solid arrow in FIGURE 1) to advance the lowermost document on tray 12 upwardly. While belt 30 of primary feed 14 is illustrated substantially midway between sides 62 of tray 12, it is understood that belt 30 may be placed off center. Additionally, it is understood that primary feed 14 may comprise plural belts or other suitable feeding means such as one or more feed rolls.

Feed and slip rolls 40, 42, respectively, of single document limiter 16 are downstream of primary feed 14. A portion of the periphery of feed rolls 40, which are carried by shaft 130 and driven in a document feeding direction (counterclockwise as shown by the solid line arrow in FIGURE 1 of the drawings) project through opening 44 in base 60 of tray 12. Slip roll 42 is mounted on shaft 120 supported in members 45. Members 45, which may be pivotally secured to side walls 62 of tray 12, are biased inwardly toward base 60 of tray 12 to assure contact of roll 42 with document being advanced. Rolls 40, 42 are preferably formed from relatively soft elastomeric compound to provide desired frictional contact of rolls 40, 42 with documents. As will appear more fully herein, slip roll 42 rotates in a direction opposite to that of roll 40.

The upper end of base 60 of document tray 12 is curved at 60'. Document guide 68, the curvature of which is substantially the same as that of base portion 60' is spacedly positioned thereabove. Curved base portion 60' and guide 68 cooperate to form a curved path for routing the document leaving single document limiter 16 onto platen 26, which in the exemplary showing of the drawings is substantially horizontal. Intermediate feed 18 comprises one or more pairs of feed and idler rolls 70, 71, respectively, the peripheral surfaces of which project through suitable openings in guide 68 and base section 60' respectively into operative engagement with one another. Suitable means (not shown) are preferably provided to maintain rolls 70, 71 in releasable engagement with one another. Rolls 70, 71 cooperate to feed the document along the curved path formed by base 60' and guide 68 into operative relationship with transport 20.

Where document feed apparatus 10 is used with a copying or reproducing machine (not shown), platen 26 may comprise a generally rectangular transparent or window section 80 having an opaque border 81. Border 81 is raised slightly above transparent section 80 at the document inlet end to provide a document registering stop 82. As will be more apparent hereinafter, the trailing edge of each document fed onto platen surface 26 is registered with stop 82. The portion 83 of border 81 at the document discharge side is preferably flush with or slightly below the level of transparent section 80 to facilitate egress of documents from the platen.

Transport 20 comprises a belt 85 arranged above platen 26 and movably supported by drive and idler rollers 86, 87 respectively. Rollers 86, 87 are mounted on shafts 89, 90, respectively, journaled in longitudinally extending supports 91. Supports 91 may be pivotally attached through shaft 89 to the device with which feed apparatus 10 is employed to permit transport 20 to be raised for access to platen 26. In the arrangement illustrated the weight of transport 20 establishes the necessary frictional relationship between the working surface of belt 85 and the document platen 26. Idler roller 87 serves to bias belt 85 outwardly into contact with platen 26 closely adjacent stop 82 to assure engagement of the document trailing edge with stop 82 on reversal of belt 85.

Where document feed apparatus 10 is used with a photo or electrostatic type copying machine (not shown) belt 85 is preferably composed of an outer working layer 92 formed from a flexible light reflective material such as white rubber, plastic, etc. with an inner or backing layer 93 formed from a suitable flexible electrically conductive material such as graphite impregnated rubber secured as by bonding thereto. For example, outer belt layer 92 may be comprised of white or light colored polyolefin or neoprene with inner layer 93 comprised of graphite impregnated neoprene. Outer layer 92 of belt 85 which is sized to overlay platen window section 80, serves as a light reflector and as a means to feed documents across platen 26. Inner layer 93 serves to ground belt 85 through rollers 86, 87 to document feed apparatus 10 to prevent undesired build-up of electrical charge on belt 85.

Discharge feed 22 may comprise one or more belts 95 operatively supported by drive and idler rollers 96, 97, respectively. The inlet side of belts 95 is slightly below the level of platen 26 and proximate to the discharge side thereof. As can be understood, documents carried across platen 26 by belt 85 of transport 20 fall onto belt 95 of discharge feed 22. Return document tray 24 may comprise any suitable receptacle for storing returned documents. Tray 24 is arranged adjacent to and slightly below the discharge end of feed 22.

Figure 2:
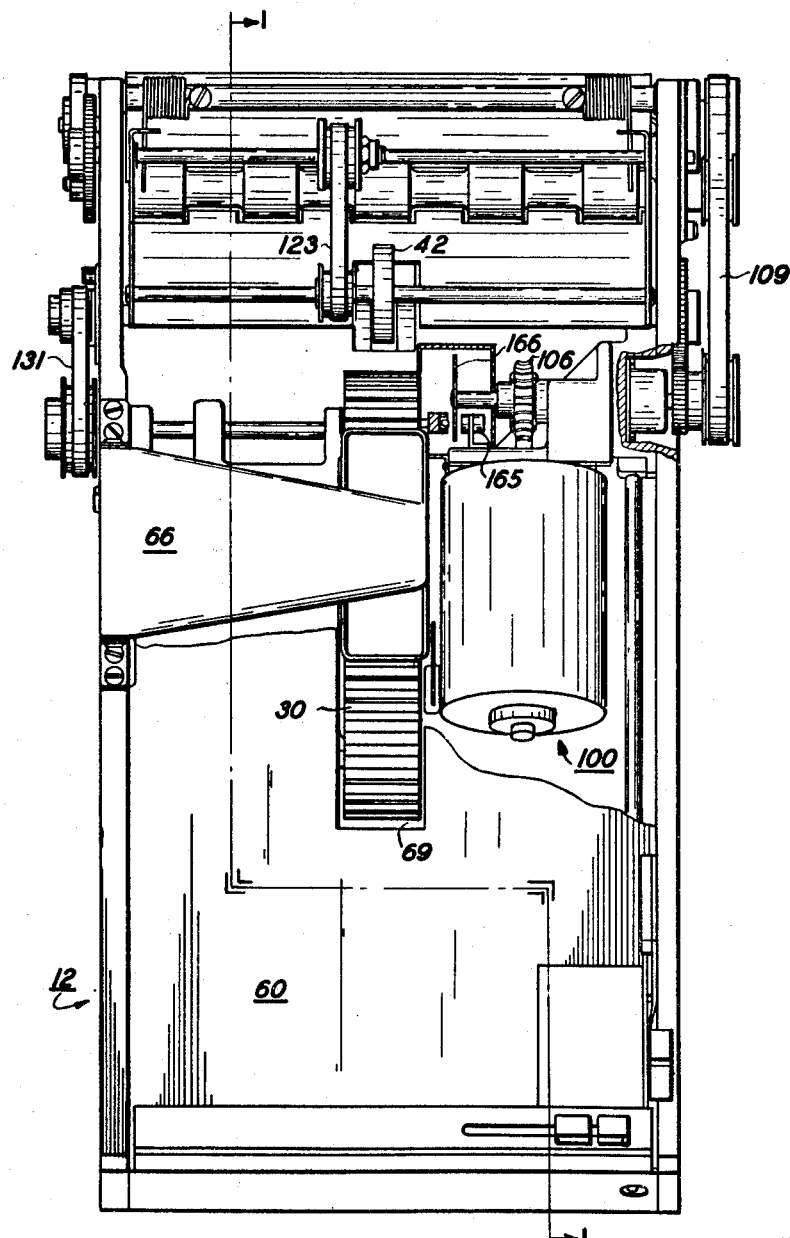
FIGURE 2 is an end view with parts broken away showing the document storage tray and document feed mechanism for the apparatus shown in FIGURE 1.
Figure 3:
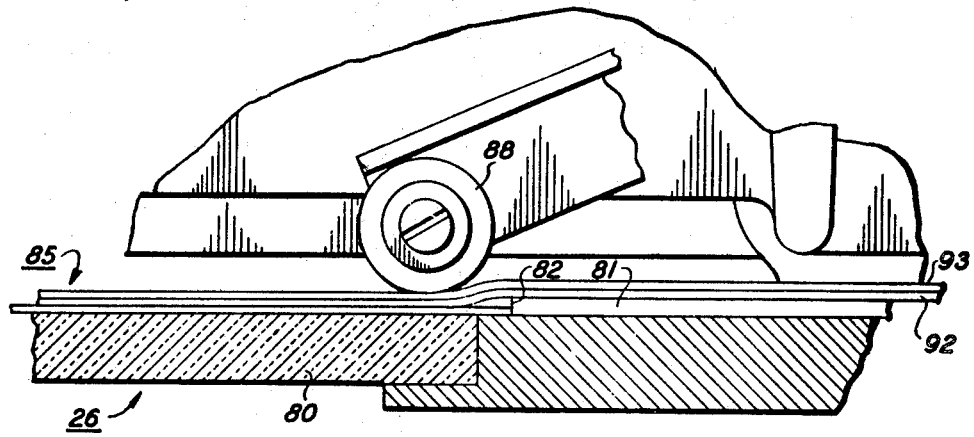
FIGURE 3 is an enlarged cross sectional view of the apparatus shown in FIGURE 1 illustrating the document registering stop and the transport belt.
Figure 4:
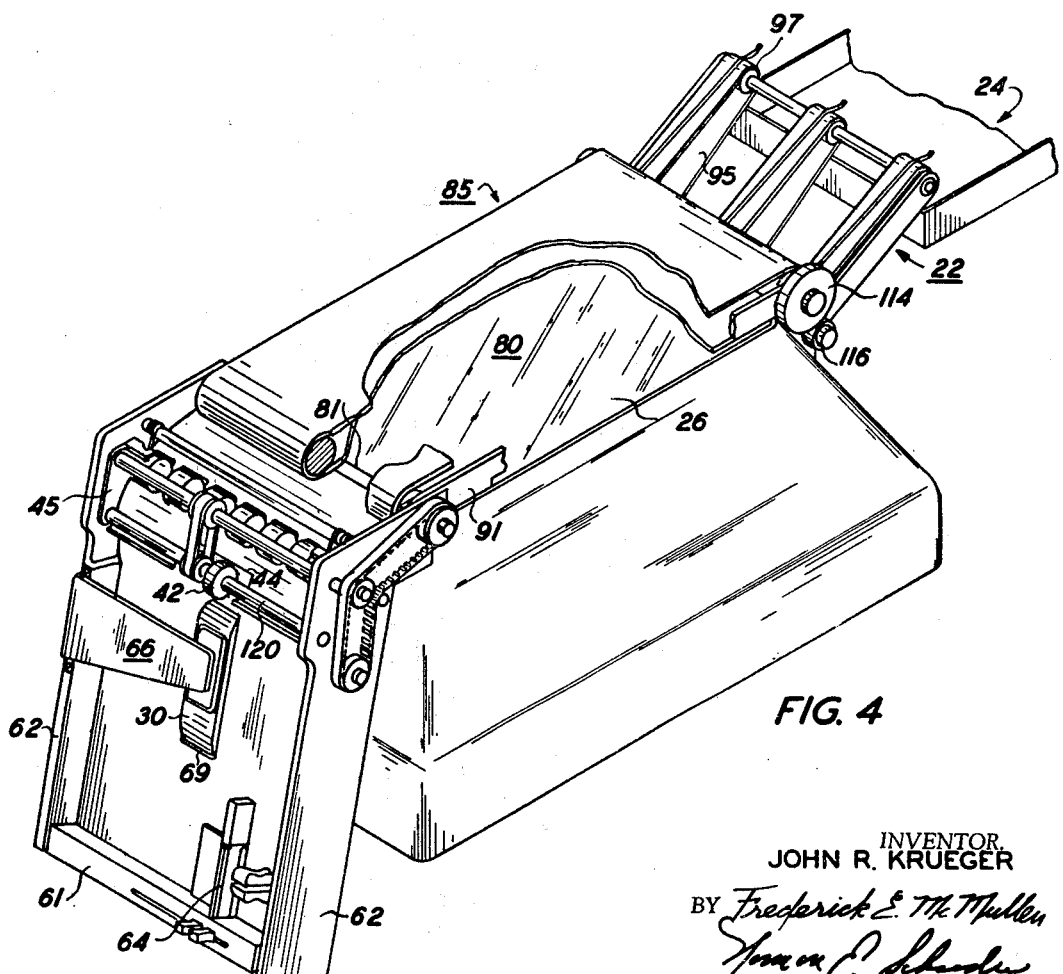
FIGURE 4 is an isometric view of the apparatus shown in FIGURE 1 with parts broken away showing the platen and document transport mechanism.
Figure 5:
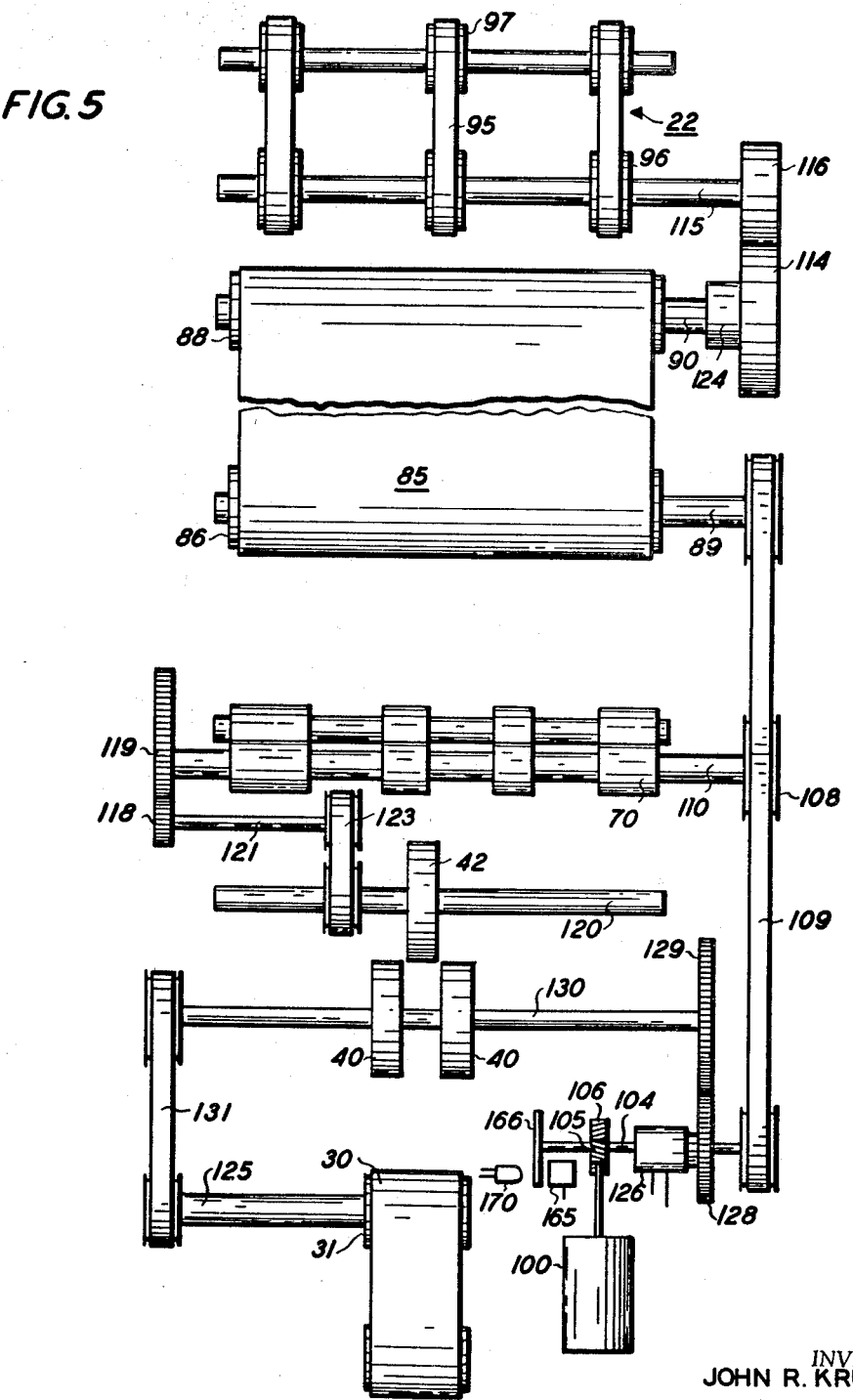
FIGURE 5 is a schematic view of the drive mechanism for the ducument feeding apparatus shown in FIGURE 1.

Referring particularly to FIGURES 2 and 5, a reversible drive motor 100 which is preferably supported from document tray 12 is used as the power source for document feed apparatus 10. Output shaft 102 of motor 100 is drivingly connected to power take-off shaft 104 by gears 105, 106.

Belt 109 drivingly connects power take-off shaft 104 with one-way clutch 108 on shaft 110 supporting feed roll 70 of intermediate feed 18 and with shaft 89 supporting drive roller 86 of transport belt 85. Idler shaft 90 which supports idler roller 88 of transport belt 85 has drive disc 114 mounted thereon and drivingly connected thereto through one way clutch 124. Disc 114 is engageable with disc 116 on shaft 115 of discharge feed 22 to drive rollers 96 thereof in a document removing direction (counterclockwise as shown by the solid line arrow in FIGURE 1) when transport 20 is placed in operative position.

When motor 100 is reversed to drive belt 85 backwards, clutches 108, 124 are disengaged to prevent backward or reverse movement of feed roll 70 and discharge feed belts 95.

Roll 42 of single document limiter 16 is mounted on rotatable shaft 120. Shaft 120 is driven through belt 123 from idler shaft 121. Gear 118 on shaft 121 meshes with gear 119 on shaft 110 of intermediate feed roll 70. Roll 42 ordinarily slips on the surface of the document being fed forward by belt 30 of primary feed 14 and rolls 40 of document limiter 16. However where two or more documents are fed forward, roll 42 rejects the uppermost ones of the documents to limit feed to a single document.

Shaft 130 supporting feed rolls 40 of single document limiter 16 is driven from power take-off shaft 204 through clutch 126 and meshing gears 128, 129. Shaft 125, supporting drive roller 31 of primary feed 14 is drivingly connected to shaft 130 by means of belt 131. Clutch 126 which may be an electromagnetic type clutch, permits the driving connection of motor 100 with feed rolls 40 of single document limiter 16 and with primary document feed 14 to be interrupted.

Figure 6:
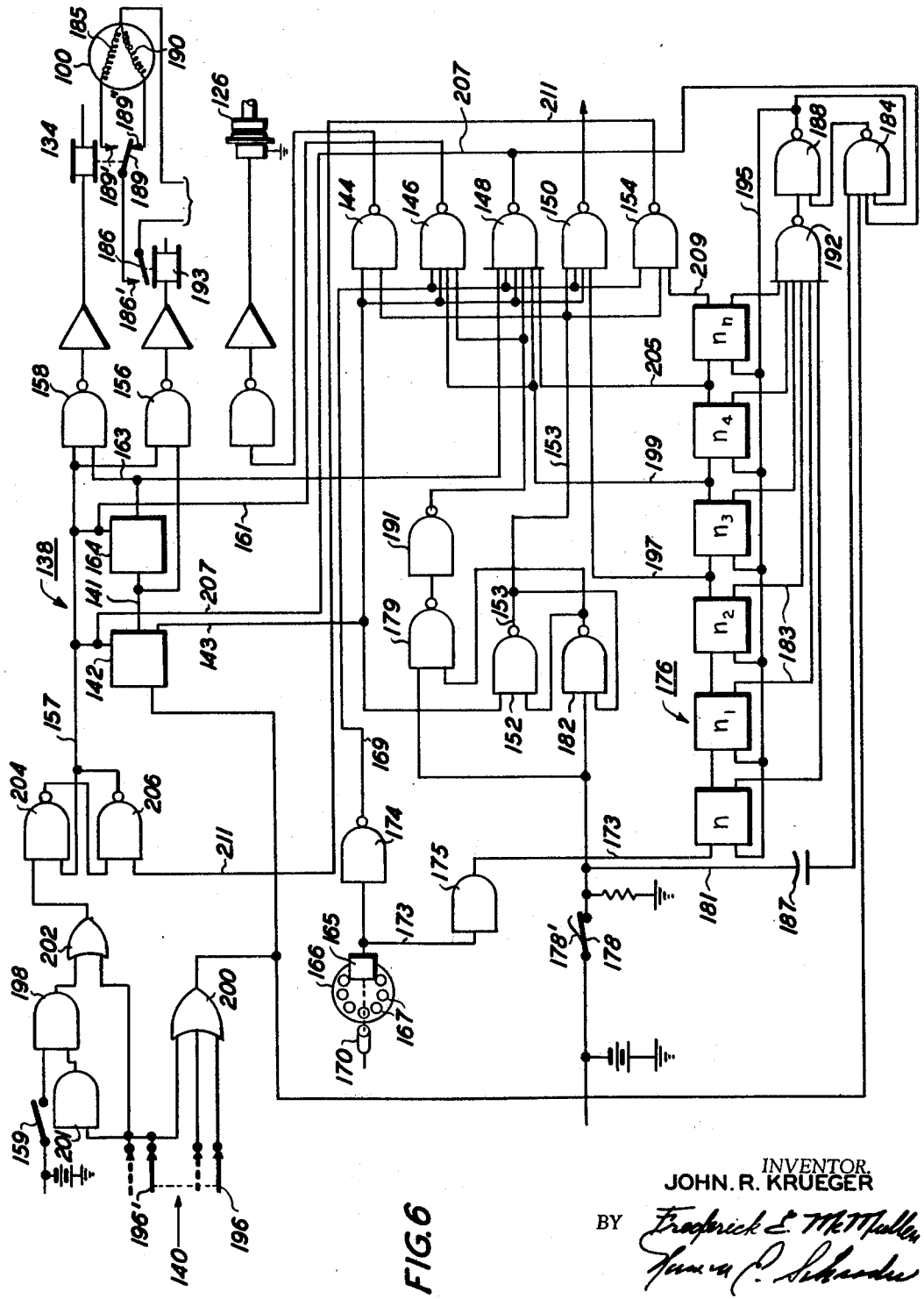
FIGURE 6 is a schematic view of the control circuit for the apparatus shown in FIGURE 1.

Referring to FIGURE 6, there is shown a control circuit 138 for document feed apparatus 10 adapted to regulate the document feed apparatus in accordance with the preset demands of master controller 140. Controller 140 which may for example comprise the programmer for the device with which document feed apparatus 10 is used, such as a copier, includes a pair of gang operated control switches 196, 196'. Switches 196, 196' are movable from an "off" position to either an automatic document feed mode (the solid line position of FIG. 6) or to a semi-automatic document feed mode (the dotted line position of FIG. 6). Automatic feed mode refers to automatic advancing of each succeeding onto platen 26 whereas semi-automatic feed mode refers to advance of a single document only onto platen 26. Switch 196, which is connected to the gate of OR circuit 200, is adapted to generate an actuating signal when start-up of document feeding apparatus 10 is desired. Switch 196' which in the automatic feed mode is connected to the gates of OR circuit 200 and signal inverter 201 and in the semi-automatic feed mode to the gate of OR circuit 202, is adapted to generate an actuating signal when use of the document then on platen 26 is completed.

Control circuit 138 includes a pair of switching circuits 142, 164 which may for example comprise flip-flop circuits, each having a pair of control gates, termed set and reset gates, and a corresponding pair output taps termed set and reset taps. The output side of OR circuit 200 may be connected to the set gate of circuit 142. The corresponding set output tap thereof is connected by line 143 to the gates of NAND circuits 144, 146, 148, 150, 152. The reset output tap of circuit 142 is connected by line 141 to the set gate of circuit 164 and to the gate of NAND circuit 156 while the reset gate thereof is connected to the output side of NAND circuits 148, 206. The set output tap of circuit 164 is connected by line 163 to the gates of NAND circuits 148, 158. The reset gate of circuit 164 is connected with the output side of NAND circuits 146, 206.

While NAND circuits or gates described herein, other suitable AND function circuits such as AND circuits, OR circuits, NOR circuits, or combinations of NAND, AND, OR or NOR circuits may suggest themselves to those skilled in the art.

NAND circuit 144 controls, through suitable circuitry (not shown), operation of clutch 126, circuit 144 being adapted when triggered to engage clutch 126. NAND circuits 146, 148 control operation of motor 100 in the forward and reverse directions, respectively. Through suitable circuitry (not shown), NAND circuit 150, when triggered, renders motor 100 inoperative to stop document feed apparatus 10. As will appear more fully, circuit 150 is triggered on failure of a document to feed, as for example, due to jamming. NAND circuit 154 when triggered, operates motor 100 in a forward feed direction to clear the last document from platen surface 26 while NAND circuit 152 together with NAND circuits 179, 182 form a document movement responsive control.

A photoelectric type signal generator 165 with light source 170 therefor is provided. An apertured disc 166 is arranged between signal generator 165 and light source 170. Disc 166 is preferably secured to power take-off shaft 104. Apertures 167 in disc 166 permit light from light source 170 to register on signal generator 165 whereby signal generator generates a pulse-like signal output as power take-off shaft 104 rotates during operation of document feed apparatus 10.

The signal output from generator 165 is fed to a suitable signal inverting and retarding device such as NAND circuit 174, the inverted signal passing through line 169 to the gates of NAND circuits 146, 148, 150 and 154. Additionally, the signal output of generator 165 passes via line 173 to the set gate of first stage $n$ of cycle counter 176. Preferably suitable signal retarding means 175 is provided to delay the signal input of generator 165 to counter 176 and prevent mechanical oscillations, which may be present in the signal generating mechanism, from falsely triggering counter 176.

Cycle counter 176 may be conveniently comprised of a number of bistable switching circuits or stages $n$, $n_1$, $n_2 \ldots n_n$ series connected to one another. The set output taps of certain counter stages, such as $n_2$, $n_3$, $n_4$, $n_n$ are tapped to obtain desired control timing increments as will be more apparent hereinafter. The reset output taps of counter stages $n$, $n_1$, $n_2 \ldots n_n$ are connected by line 183 to the gate of NAND circuit 192 while the reset gates of stages $n$, $n_1$, $n_2 \ldots n_n$ are connected by line 195 to the output of NAND circuit 188.

Normally closed switch 178 on tray 12 has an actuating arm 178' in the path of document movement. As a document feeds toward platen 26, the leading edge thereof engages switch 178' opening switch 178. The body of the document retains switch 178 open until the document trailing edge passes therebeyond. Switch 178 is connected to the gates of NAND circuits 179 and 182 and through capacitor 187 to the gate of NAND circuit 184.

NAND circuits 184, 188, 192 control counter 176, the signal from circuit 184, when rendered inoperative in response to certain hereinafter described operational conditions of document feeding apparatus 10, combining with a signal from circuit 192 to trigger circuit 188 and reset counter 176. As counter stages $n$, $n_1$, $n_2 \ldots n_n$ reset, the signals at the reset tap thereof combine to trigger circuit 192 which renders circuit 188 inoperative terminating the reset cycle.

Winding 185, controlling rotation of motor 100 in the document feeding direction, and winding 190 controlling rotation of motor 100 in the reverse direction, are connected through switches 186, 189, respectively, with a suitable source of power. Switching relays 193, 194 control switches 186, 189, respectively. When energized, relays 193, 194 close switch contacts 186' 189', respectively, to complete an energizing circuit to winding 185 of motor 100 whereby document feed apparatus 10 is driven in the document feeding direction by motor 100. Switching relay 194, when de-energized, closes switch contact 189'' so that on energization of switching relay 193 only, there is completed an energizing circuit to winding 190 through switch contacts 186', 189'' whereby document feed apparatus 10 is driven in the reverse direction by motor 100.

As will appear more fully, start up of document feeding apparatus 10 is effected by switching circuits 142, 164 whereby the signal from the output taps thereof to the gates of NAND circuits 156, 158, respectively, falls to zero. Circuits 156, 158 are accordingly rendered inoperative, the signal output of circuits 156, 158 operating relays 193, 194, respectively, to close switch contacts 186', 189 thereof and energize motor winding 185. Motor 100 accordingly drives feeding apparatus 10 in a document feeding direction.

Switch 196' of controller 140, when in the automatic mode (the solid line position in FIGURE 6) is connected through inverter 201 to the gate of NAND circuit 198. A switch 159 on tray 12 closes whenever the supply of documents on tray 12 is exhausted. Switch 159 is connected to the gate of circuit 198.

The output side of circuit 198 is connected to the gate or OR circuit 202. Switch 196', when in the semi-automatic mode (the dotted line position in FIGURE 6), is connected to the gate of OR circuit 202. The output side of OR circuit 202 connects to the gate of NAND circuit 204.

The output side of circuit 204 is connected to the gate of circuit 206. The output side of NAND circuit 206 is connected to the gates of NAND circuits 156, 204 and to the reset gates of circuits 142, 164. Circuit 206, when triggered prevents circuits 142, 164 from being switched whereby operation of the document feeding apparatus 10 to clear the last document from platen 26 may be effected.

The output side of circuits 154 is connected to the gate of NAND circuit 206. Circuit 154, when triggered renders circuit 206 inoperative thereby triggering circuits 156, 158 to stop feeding apparatus 10.

With at least one document on tray 12 and switches 196, 196' of controller 140 positioned in either automatic or semi-automatic mode, the actuating signal from switch 196 to OR circuit 200 switches circuit 142. The signal appearing of the set tap of circuit 142 is fed by line 143 to the gates of AND circuits 144, 146, 148, 150 and 152. The combined signal inputs from circuits 142, 152 trigger circuit 144 whereby clutch 126 is engaged.

At the same time, the loss of signal at the reset tap of circuit 142 and in line 141 switches circuit 164 whereby the signal at the set tap of circuit 164 to line 163 falls to zero. The loss of signal in lines 141, 163 renders NAND circuits 156, 158 inoperative. Switching relays 193, 194 are therefore actuated closing switch contacts 186', 189' respectively, to energize winding 185 of motor 100. Motor 100, therefore, drives primary feed 14, rolls 40 of single document limiter 16, intermediate feed 18, transport 20 and discharge feed 22 of the apparatus 10 in a document feeding direction.

With start up of document feed apparatus 10, the pulse-like signal output of generator 165 passes through signal inverter and retard circuit 174 to line 169 and the gates of NAND circuits 146, 148, 150, 154, and through signal retard means 175 to line 173 and the set gate of stage $n$ of counter 176. The signal input of generator 165 to stage $n$ starts counter 176.

At start up of the document feeding apparatus 10, NAND circuit 182 is triggered by the combined signals of switch 178 and circuit 152. The signal output of circuit 182 to NAND circuits 152, 179 accordingly falls to zero. NAND circuit 179 is therefore inoperative and the signal output of inverter 191 is zero. As the document being fed moves toward platen 26, the leading edge thereof strikes switch arm 178', opening switch 178 and interrupting the signal output of switch 178 to NAND circuit 182. The los of signal input renders circuit 182 inoperative, the ensuing signal output of circuit 182 combining with the signal input of circuit 142 to trigger NAND circuit 152. The signal in line 153 leading to the gates of NAND circuits 144, 150, 154, and 182 is accordingly removed. Circuit 144 is accordingly rendered inoperative, disengaging clutch 126 and stopping primary feed 14 and rolls 40 of single document limiter 16.

The signal pulse generated upon opening of switch 178 renders NAND circuit 184 inoperative, the ensuing signal output therefrom combining with that of NAND circuit 192, which is inoperative, to trigger circuit 188. Triggering of circuit 188 resets counter 176, the combined signal inputs of counter stages $n, n_1, n_2 \ldots n_n$, when reset, triggering circuit 192 to terminate the reset cycle.

Should switch 178 fail to open following predetermined operation of apparatus 10, the signal output of counter stage $n_2$, when triggered to line 197 combines with signal inputs from circuits 142, 152 and signal generator 165 to trigger circuit 150 whereby motor 100 is de-energized and feeding apparatus 10 stopped. As described heretofore, where the document feed is normal, the moving document opens switch 178 triggering NAND circuit 152. The resulting loss of signal to circuit 150 prohibits counter 176 from triggering circuit 150.

Assuming normal document feed, switch 178 is maintained in an open position by the weight of the document on switch arm 178'. As the document trailing edge passes therebeyond switch 178 recloses, the signal therefrom combining with the signal from circuit 182, which is inoperative, to trigger circuit 179. The ensuing signal output of inverter 191 is fed to the gates of NAND circuits 146, 148.

Following preset movement of document feeding apparatus 10, the signal output of counter stage $n_3$ to line 199 combines with signal inputs from circuits 142, 191 and signal generator 165 to trigger circuit 146. The resulting loss of signal in line 161 switches circuit 164, the signal appearing at the set output tap and in line 163 connected thereto combining with the signal from NAND circuit 206 which is inoperative to trigger circuit 158 and de-energized switching relay 194. De-energization of relay 194 opens switch contact 189' and closes contact 189". Closure of switch contact 189" completes a circuit through switch contacts 186', 189" to winding 190 of motor 100 whereby motor 100 is reversed to drive transport belt 85 backwards to register the document trailing edge with stop 82. It is understood that clutches 108, 124 interrupt the driving connection to intermediate and discharge feeds 18, 22, respectively. And as described heretofore, clutch 126 connecting motor with the primary feed 14 and rolls 40 of single document limiter 16 is previously disengaged.

Following predetermined movement of transport 20 backwardly, the signal output of counter stage $n_4$ to line 205 combines with the signal inputs from circuits 142, 164, 191 signal generator 165, and counter stage $n_3$ to trigger circuit 148. The resulting loss of signal in line 207 switches circuit 142, the signal at the reset tap thereof to line 141 combining with the signal input from circuit 206 to trigger circuit 156 whereby relay 193 is de-energized and motor 100 stopped. Additionally, the loss of signal in line 207 renders circuit 184 inoperative thereby triggering circuit 188 and resetting counter 176 as described heretofore.

Where switches 196, 196' of controller 140 are in the automatic mode (the solid line position in FIGURE 6), the actuating signal from switch 196' to OR circuit 200, when use of the document on platen 26 is completed, switches circuit 142 to restart document feeding apparatus 10 as described heretofore. When restarted transport 20 carries the document on platen 26 onto belts 95 of discharge feed 22 which in turn carry the document into return tray 24.

When the last document on tray 12 is fed forward tray switch 159 closes placing a signal on the gate of NAND circuit 198. When use of that document is completed, the actuating signal from switch 196' to inverter 201 and circuit 198 combines with the signal input of switch 159 to trigger circuit 198 whereby NAND circuit 204 is rendered inoperative. The ensuing signal input of circuit 204 combines with that of circuit 154 to trigger circuit 206. The loss of signal in line 157 leading to the gates of circuits 156, 158 renders circuits 156, 158 inoperative thereby energizing winding 185 of motor 100 whereby document feeding apparatus 10 is operated in a document feeding direction. Transport 20 and discharge feed 22 accordingly cooperate to transport the document from platen 26 to return tray 24. The loss of signal from line 157 to the reset taps of circuits 142, 164 prevents switching of circuits 142, 164 by switch 196'.

With start up of feeding apparatus 10, the signal input from signal generator 165 to counter 176 resumes. Following predetermined feeding movement of the apparatus 10, a signal from counter stage $n_n$ to line 209 combines with signals from circuit 152 and signal generator 165 to trigger circuit 154. The ensuing loss of signal in line 211 renders circuit 206 inoperative. The ensuing signal from circuit 206 combines with the signal output of circuits 142, 164, respectively, to trigger circuits 156, 158. As noted heretofore, circuits 156 when triggered, de-energize switching relay 193 to open switch 186 and stop motor 100.

Inasmuch as circuit 206, when triggered prevents circuit 142 from being switched, the signal at the set tap of circuit 142 to line 143 and NAND circuits 146, 148, 150 is zero. The signal outputs of counter stages $n_2$, $n_3$, $n_4$ to circuits 146, 148, 150, respectively, during the predetermined movement of feeding apparatus 10 required to clear the last document from platen 26 and trigger counter stage $n_n$ are therefore ineffectual.

Where switches 196, 196' of controller 140 are in the semi-automatic mode (the dotted line position in FIGURE 6) the actuating signal from switch 196 to OR circuit 200 starts document feed apparatus 10 as described heretofore. When use of the document is completed the actuating signal from switch 196' to OR circuit 202 renders NAND circuit 204 inoperative. With circuit 204 inoperative, motor 100 is energized in the forward direction through circuit 206 as described heretofore. Following predetermined feeding movement of apparatus 10, counter stage $n_n$ triggers circuit 154 to shutdown apparatus 10.

While I have described and illustrated herein a preferred form of my invention, it will be apparent to those skilled in the art that changes and modifications may be made thereto without departing from the spirit and intent of my invention which is to be limited only to the scope of the appended claims.

What is claimed is:

1. In an apparatus for feeding documents from a document supply onto a platen surface, the feeding apparatus including a first transport adapted to transport one document at a time forward from said document supply, a second transport downstream of said first transport adapted to transport documents from said first transport to said platen surface, and a reversible motor for driving said first and second transports, the combination of, control means for said motor including forward switch means adapted when actuated to operate said motor in one direction and drive said first and second transports forward whereby to transport a document to said platen surface;

means for stopping said first transport following predetermined movement of the document including clutch means to permit said first transport to be uncoupled from said motor, a controlling gate for said clutch means, and means responsive to movement of the document adapted on predetermined document movement to trigger said clutch controlling gate whereby to disengage said clutch means and stop said first transport;

said motor control means including reverse switch means adapted when actuated to reverse said motor; and means responsive to movement of said second transport adapted following predetermined forward movement of said second transport to actuate said reverse switch means while rendering said forward switch means inoperative whereby to reverse said motor and drive said second transport backwards, said transport movement responsive means being adapted following predetermined backward movement of said second transport to render said reverse switch means inoperative whereby to shut down said motor and stop said document feeding apparatus.

2. The document feeding apparatus according to claim 1 in which said transport movement responsive means includes binary counting means, signal pulse generating means for driving said counting means in accordance with movement of said second transport, said counting means being adapted following a predetermined signal pulse input to actuate said reverse switch means and reverse said motor.

3. The document feeding apparatus according to claim 2 including a reset controlling gate adapted when triggered to reset said counting means, said document movement responsive means being adapted following said predetermined document movement to trigger said reset controlling gate and reset said counting means whereby said counting means is cleared to count said predetermined signal pulse input.

4. The document feeding apparatus according to claim 1 in which said forward switch means is adapted when actuated to render said reverse switch means inoperative.

5. The document feeding apparatus according to claim 1 including a last document controlling gate adapted when triggered to bypass said forward switch means and operate said motor in said one direction and drive said second transport forward to clear said platen surface, said transport movement responsive means being adapted following second predetermined movement of said second transport to render said last document controlling gate inoperative whereby to stop said second transport.

6. The document feeding apparatus according to claim 1 including a safety controlling gate adapted when triggered to override said forward switch means and stop said motor whereby said first and second transports are stopped, said second transport movement responsive means being adapted following preset minimum second transport movement to trigger said safety controlling gate, said document movement responsive means being adapted to intercede and disable said safety controlling gate where the document being fed has moved at least a predetermined amount before said second transport has moved said preset minimum.

References Cited
UNITED STATES PATENTS 3,010,160 11/1961 Lytton _____ 198—110
3,270,930 9/1966 Emerson _____ 226—49

RICHARD AEGERTER, Primary Examiner

U.S. Cl. X.R.
198—76